United States Patent [19]
Hyland et al.

[11] Patent Number: 6,095,868
[45] Date of Patent: Aug. 1, 2000

[54] CARD READER CONNECTOR HAVING A SEPARABLE COVER

[75] Inventors: James Henry Hyland, Hummelstown; John Lawrence Broschard, III, Hershey, both of Pa.

[73] Assignee: The Whitaker Corporation, Wilmington, Del.

[21] Appl. No.: 09/035,452

[22] Filed: Mar. 5, 1998

Related U.S. Application Data

[60] Provisional application No. 60/041,176, Mar. 21, 1997.

[51] Int. Cl.$^7$ ................................................... H01R 23/70
[52] U.S. Cl. ........................................ 439/630; 439/928.1
[58] Field of Search .................................. 439/630, 260, 439/325, 326; 235/441

[56] References Cited

U.S. PATENT DOCUMENTS

| | | | |
|---|---|---|---|
| 4,806,103 | 2/1989 | Kinese et al. ............................ | 439/60 |
| 4,961,710 | 10/1990 | Komatsu ................................ | 439/267 |
| 5,161,989 | 11/1992 | Okubo et al. ........................... | 439/159 |
| 5,231,274 | 7/1993 | Reynier et al. ......................... | 235/441 |
| 5,653,610 | 8/1997 | Broschard .............................. | 439/630 |
| 5,655,917 | 8/1997 | Kaneshige et al. .................... | 439/155 |
| 5,718,609 | 2/1998 | Braun et al. ........................... | 439/630 |
| 5,775,949 | 7/1998 | Bricaud et al. ........................ | 439/630 |
| 5,823,828 | 10/1998 | Bricaud et al. ........................ | 439/630 |

FOREIGN PATENT DOCUMENTS

| | | |
|---|---|---|
| 0 738 983 | 10/1996 | European Pat. Off. . |
| 0 738 983 A1 | 10/1996 | European Pat. Off. . |
| 0 743 717 | 11/1996 | European Pat. Off. . |
| 0 743 717 A2 | 11/1996 | European Pat. Off. . |

OTHER PUBLICATIONS

Abstract and drawings for File No. 16693, Serial No. 08/935,3553 filed Sep. 23, 1997 based on Provisional Application Serial No. 60/027,268 filed Sep. 26, 1996.

Abstract and drawings for File No. 16787A, Serial No. 09/116,139 filed Jul. 15 1998 based on CIP 08/950,115 filed Oct. 14, 1997, based on Provisional Application 60/028,531 Oct. 17, 1996.

Abstract and drawings for File No. 16908, Serial No. 08/984,612 filed Dec. 3, 1997, based on Provisional Application 60/039,828 filed Feb. 27, 1997.

*Primary Examiner*—Michael L. Gellner
*Assistant Examiner*—Briggitte R. Hammond

[57] ABSTRACT

A card reader connector (10) includes a base (12) having a plurality of contacts (70) therein and a cover (40) dimensioned to receive a card (80), the base (12) and cover (40) being securable together to effect reading of the card (80). Each base side wall (28) includes at least a pair of flanges (30), each defining a clamping surface (33). The cover (40) includes card support rail portions (62) and at least a pair of spaced apart connector clamps (64) adapted to engage a clamping surface (33) of a respective flange (30). Upon full assembly, the cover clamps (64) and the base flanges (30) bias the cover (40) and base (12) together and secure the cover (40) and base (12) from relative lateral movement and from movement directly apart for the contacts (70) of the base (12) to assuredly remain compressively engaged with corresponding contact pads of the card (80).

7 Claims, 3 Drawing Sheets

6,095,868

CARD READER CONNECTOR HAVING A SEPARABLE COVER

This application claims the benefit of Provisional application Ser. No. 60/041,176 filed on Mar. 21, 1997.

FIELD OF THE INVENTION

This invention is directed to electrical connectors and more particularly to electrical connectors for receiving planar electronic card modules.

BACKGROUND OF THE INVENTION

Electrical connectors for electronic-memory cards, such as smart cards and subscriber identification modules (SIMs), are well know known in the computer and communications industries. These cards contain information that can be used by a card reader or card interface device to detect or read information stored in the card. Cards of this type are used, for example, in automatic teller machines, in security identification, such as smart keys or the like, or other devices. The cards contain an array of circuit pads that are accessible by the card reader connectors. The card reader connectors include a housing having a slot into which the card can be inserted and multiple terminals in the housing that engage the regions on the face of the card as it becomes fully inserted. The connector may further include end position or card detecting switches to assure that the card is fully inserted before reading occurs. The housings generally include a base in which the contacts are disposed and a cover securable to the base to define the card receiving slot.

U.S. Pat. No. 5,231,274 discloses a card reader having a frame with a plurality of contacts molded therein engaged to pads on a circuit board and having contact surfaces thereon for engaging corresponding pads on a card, and a removable cover. The cover includes latch arms along the sides that can be resiled outwardly such that they snap over the frame and snap on surfaces on the board engaging side of the frame. The cover can be removed by the use of a tool such as a screw driver to pry the resilient latch arms open so that the cover can be lifted off. It is desirable, however, to have a cover that may be removed from a card reader assembly without the use of a tool.

U.S. Pat. No. 5,320,552 discloses a cover that is pivoted into reading position after the card has been inserted into the cover. A pivotal cover, however, requires vertical space above the card reader to permit the cover to pivot and the card to be inserted and removed from the reader.

SUMMARY OF THE INVENTION

The present invention is directed to a card reader that alleviates some of the problems associated with the prior art. The card reader includes a plurality of data contacts disposed in a housing including a base and a cover dimensioned to receive a card, the base and cover being securable together to effect reading of the card. The cover and base include cooperating clamping sections operable upon full assembly. Each base side wall includes at least a pair of flanges, each defining a downwardly facing clamping surface. The cover includes card support rail portions aligned with and extending toward each other from bottom edges of the opposed side walls. Each side wall has at least a pair of spaced apart connector clamps, each clamp ending in a foot that extends inwardly from a bottom edge portion of respective the side wall and has an upwardly facing surface adapted to engage a clamping surface of a respective flange. The cover having the card therein is off-set forwardly with respect to the base during initial stages of assembly with the base flanges are positioned beside respective clamps. As the cover is translated rearwardly to a closed position, the clamps are moved relatively onto and the feet thereof are pressed against the clamping surfaces of respective base flanges and become latched therewith. The clamps and the base flanges secure the cover and base from movement directly apart.

Advantages of this invention include that it provides a card reader connector having a removable cover that receives a card and holds the card therein as the card and cover are assembled to the base. The cover is easy to assemble to a base, requires a minimum amount vertical space above the board surface to assemble to the base, and is held securely to the base. The card reader connector, furthermore, is cost effective to manufacture.

An embodiment of the invention will now be described by way of example with respect to the following drawings.

DETAILED DESCRIPTION OF THE DRAWINGS

Figure 1:
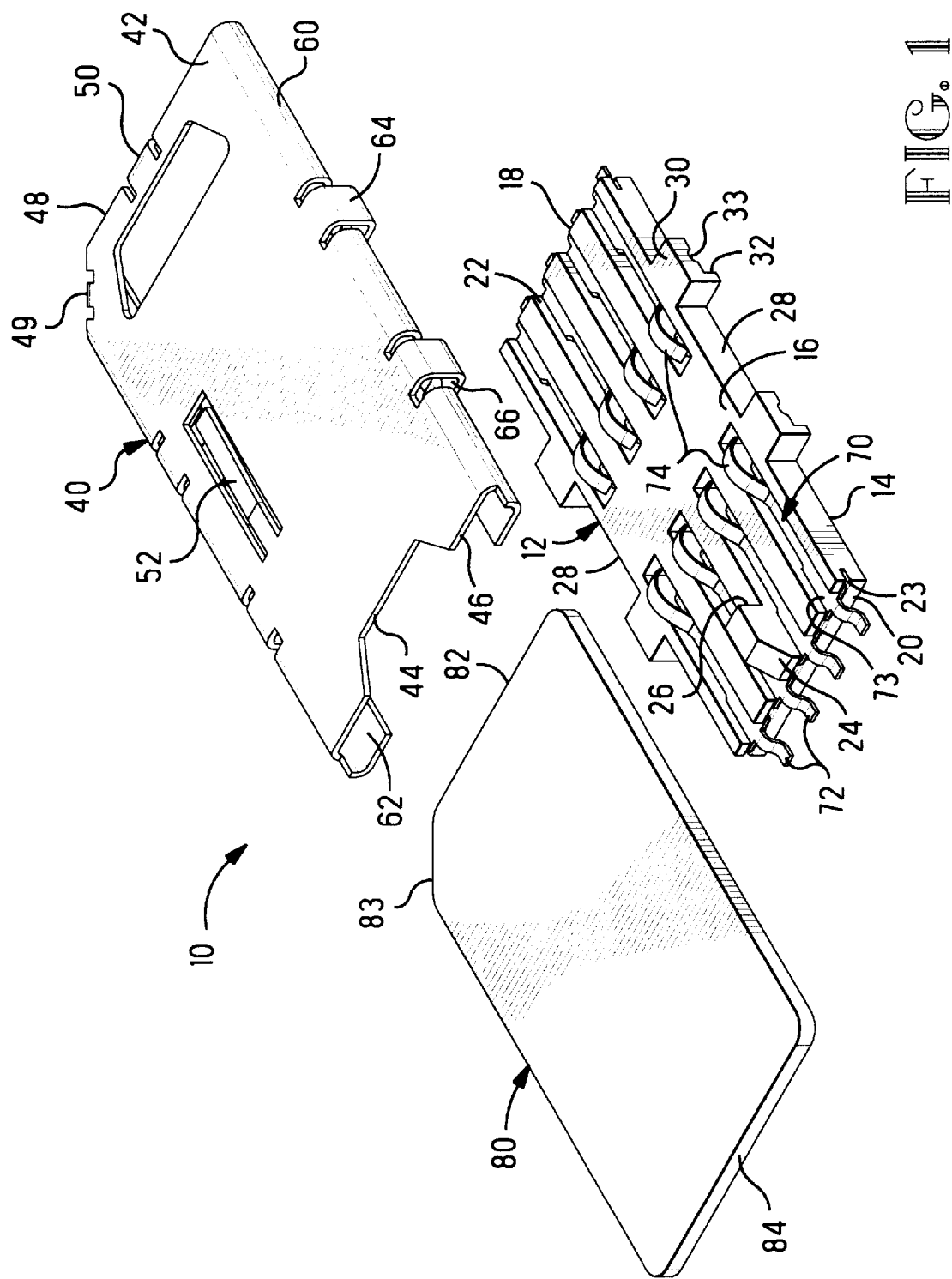
FIG. 1 is an exploded view of the assembled card reader connector made in accordance with the invention.

For purposes of illustration, the card reader connector and housing will be described with reference to a subscriber identity module (SIM) card reader. It is to be understood that the housing assembly can be used with other size cards as well, such as smart cards or the like.

Referring now to FIGS. 1 through 6, card reader connector 10 includes a insulative base 12 and a cover 40 securable together and defining a card-reading cavity extending therebetween.

Base 12 includes opposed board mounting face 14 and card receiving face 16, a forward wall or card receiving end 18, a rearward wall or end 20 and opposed side walls 28. Base 12 further includes a plurality of contact receiving slots 22, each having a respective contact 70 disposed therein. A protrusion 24 extends upwardly from card receiving face 16 and defines a first card stop surface 26 extending toward the card receiving or forward end 18. Each side wall 28 includes at least a pair of flanges 30 extending outwardly, each defining a downwardly facing clamping surface 33. One or more of the flanges 30 may further include a downwardly facing stop surface 32 that stops the rearward movement of the cover to assure the card 80 is in the proper position in card reader connector 10. Base 12 also includes alignment posts 15 on board mounting face 14 for engaging corresponding apertures in a substrate (not shown), as known in the art.

Figure 2:
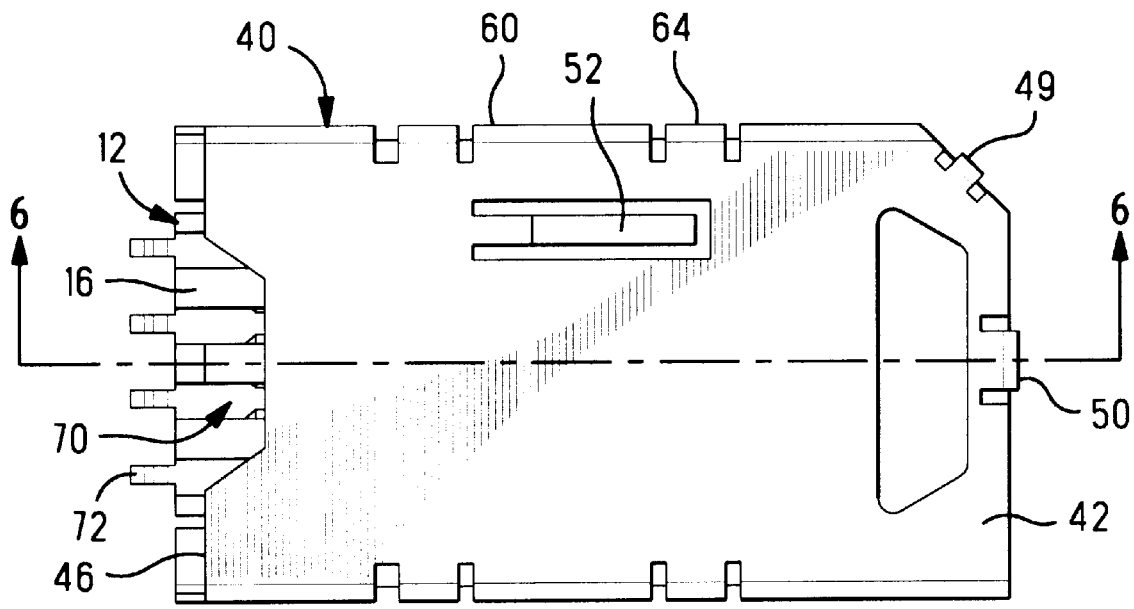
FIG. 2 is a top plan view of the card reader connector of FIG. 1.
Figure 4:
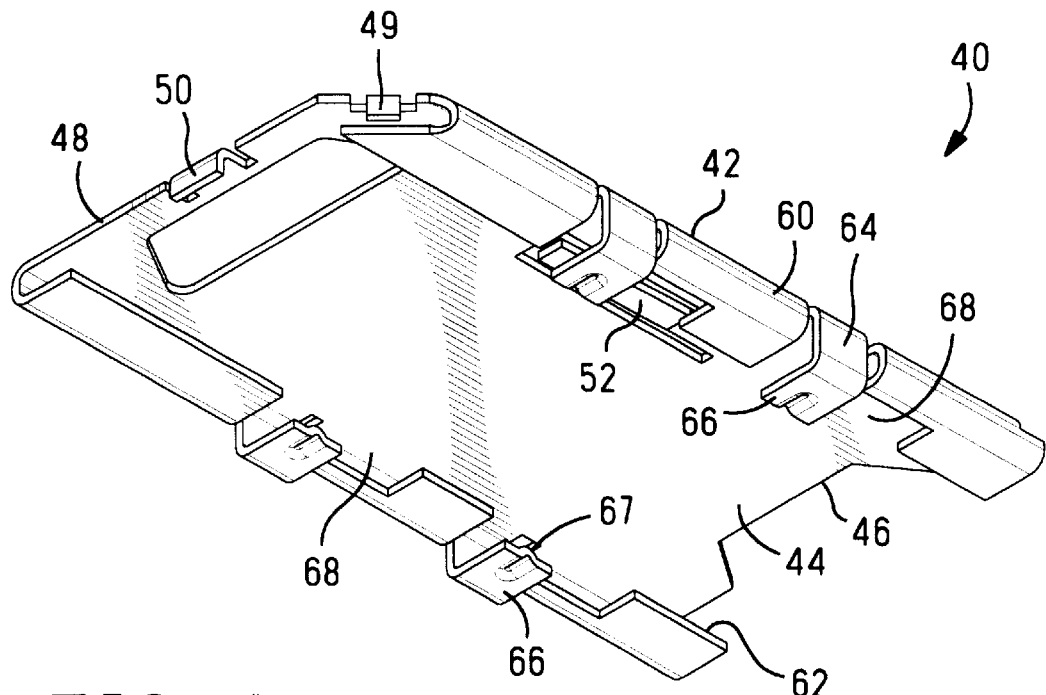
FIG. 4 is an isometric view of the underside of the cover of the connector of FIG. 1.

The cover, as best seen in FIGS. 2 and 4, includes opposed top surface 42 and inside surface 44 extending from a card receiving end 46 to a rearward end 48 and opposed side walls 60. A tab 50 extends downwardly from the rearward end 48 and defines a second card stop surface. Cover 40 includes card support rail portions 62 aligned with and extending toward each other from bottom edges of opposed side walls 60. The end edges of card-receiving rails are spaced a selected distance apart such that the side walls 28 of base 12 can be received therebetween in a close fit to assure proper alignment of the cover 40 and base 12.

Cover 40 further includes a inwardly directed cantilevered beam 52 that is used to position card 80 against the rail portions 62 during assembly onto the base and to compensate for tolerance differences in the thickness of cards inserted into the connector cover 40, thereby providing sufficient frictional resistance between the card 80 and rail portions 62 to prevent card 80 from falling out of the cover 40 during assembly of connector 10. Each cover side wall 60 includes at least a pair of spaced apart connector clamps 64, each clamp 64 ending in a foot 66 that extends inwardly from a bottom edge portion of a respective side wall 60. Each foot 66 includes an upwardly facing surface adapted to engage a clamping surface 33 of a respective flange 30. Each foot may also include an upwardly boss 67 that cooperates with a cooperating recessed surface 33 of a respective flange 30. Card support rail portions 62 further include a flange receiving opening 68 proximate each connector clamp 64 dimensioned to receive a respective flange 30 such that the clamping surface 33 can be moved into engagement with a respective clamp 64.

Contacts 70 include a solder tail 72 and a contact surface 74 extending above the card receiving face 16 and adapted to engage contact pads (not shown) on the under side of card 80.

Figure 5:
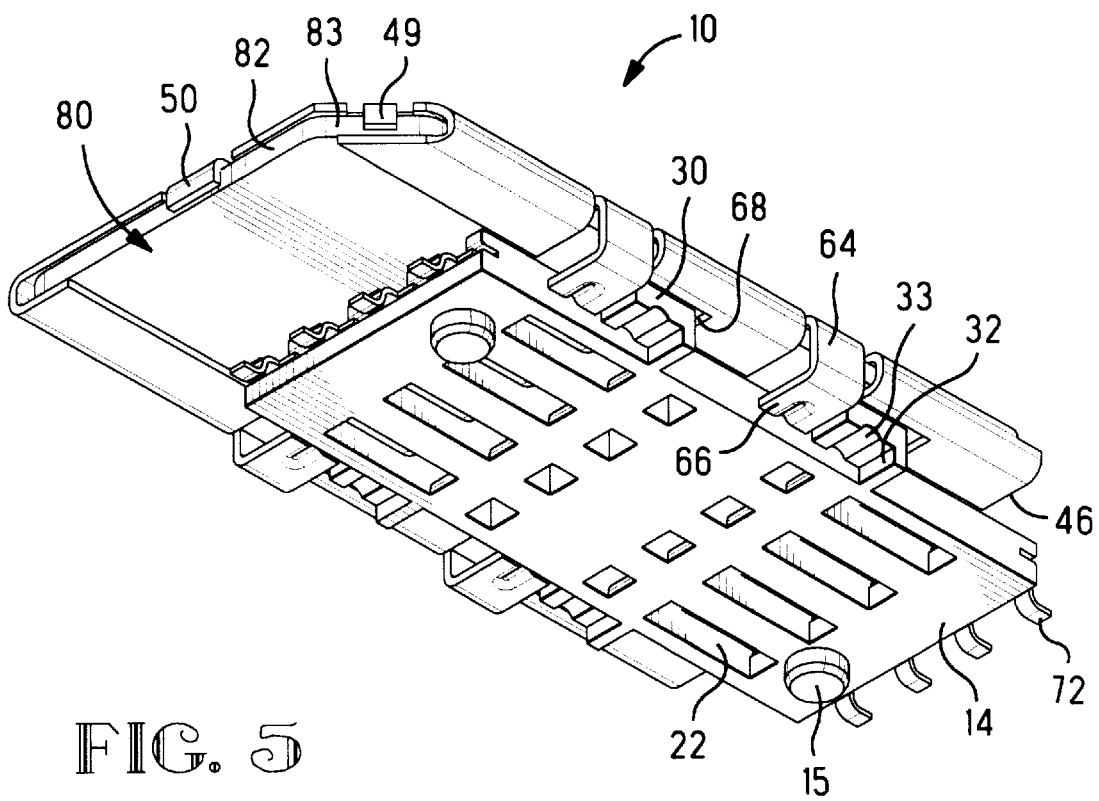
FIG. 5 is an isometric view of the partially assembled base and cover as viewed from the board mounting side, just prior to the engagement of the latching features.

Card 80 includes leading end 82 and trailing end 84. For purposes of polarization, card 80, in the embodiment shown herein, includes one corner that has a diagonal surface 83, which engages tab 49 of a cooperating diagonal corner of cover 40, as shown in FIG. 5. It is to be understood that the card and card reader are not limited to this configuration.

Figure 3:
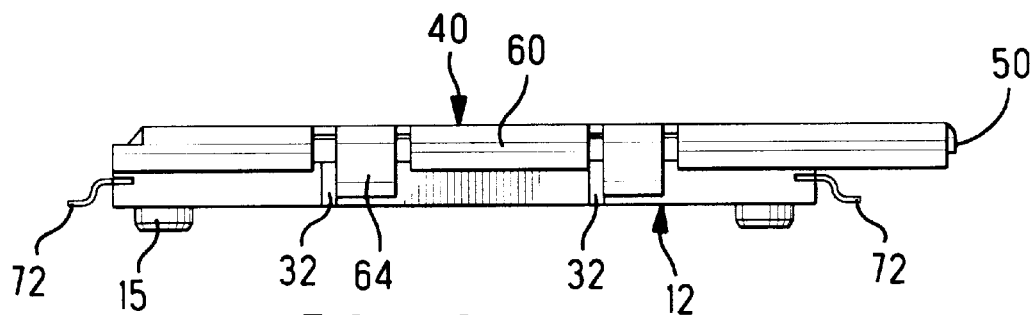
FIG. 3 is a side plan view of the assembled connector.

Upon assembling card 80 into cover 40, card 80 slides along the rails 62 until the leading card end 82 engages the retaining tab 50 at the rearward end 48 of the cover 40. Cover 40 and card 80 are then assembled to the base 12 by off-setting cover 40 forwardly with respect to the base 12 with card receiving end 46 aligned with the cover-receiving end 18 and base flanges 30 positioned beside respective clamps 64. As the cover 40 is translated rearwardly to a closed position, the clamps 64 are moved onto flanges 30 and the feet 66 are pressed against the clamping surfaces 33, as best seen in FIG. 5. As cover 40 and card 80 are moved rearwardly there is some wiping of the contact surfaces 74 of contacts 70. Cover 40 is moved rearwardly until at least one foot 66 engages a stop surface 32 on the associated flange 30, as best seen in FIG. 3, and/or trailing end 84 of card 80 engages first card stop surface 26. Concomitantly therewith the respective bosses 67 on feet 66 are received in the recessed area of the clamping surface 33, thus securing the cover 40 to the base 12. The clamps 64 and base flanges 30 bias cover 40 and base 12 together and secure the cover 40 and base 12 from relative lateral movement and from movement directly apart, thus assuring that the contact surfaces 74 of contacts 70 remain compressively engaged with the corresponding contact pads of the card 80.

Figure 6:
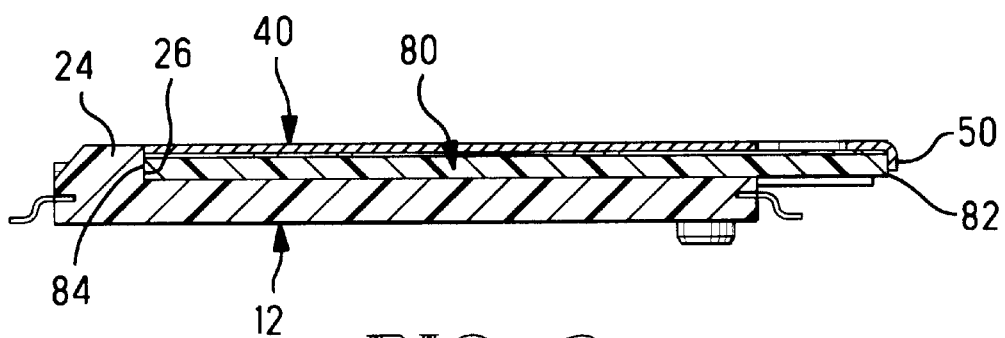
FIG. 6 is a sectional view taken along the line 6—6 of FIG. 1 illustrating the card held in the assembled connector by the cover and base.

As best seen in FIG. 6, upon full assembly of the cover 42 and the base 12 the trailing end 84 of the card is engaged against the card retention surface 26 of protrusion 24 thus trapping the card between surfaces 26 and tab 50. The card 80, therefore, can not be removed from the connector unless the cover 40 is also removed.

In accordance with one embodiment, the base 12 is a dielectric material and the cover is metal. Alternatively the cover may also be made from a dielectric material.

The card reader connector is cost effective to manufacture. The cover is easy to assemble to a base, requires a minimum amount of vertical space above the board to assemble to the base, and is held securely to the base along the side walls. The card is held securely in place by the respective stop surfaces in the cover and base.

It is thought that the card reader connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A card reader connector including a plurality of data contacts disposed in a housing, said housing including a base and a cover dimensioned to receive and hold a card therein, said base and cover being securable together, said base including forward and rearward walls and opposed side walls, said base and said cover being adapted such that said side walls of said base coextend alongside and inwardly of side walls of said cover upon assembly; the connector being characterized in that:

said base side walls each include at least a pair of flanges extending outwardly, each flange defining a downwardly facing clamping surface; and said cover includes a top surface extending from a card receiving end to a rearward end, said cover further including card support rail portions aligned with and extending toward each other from bottom edges of said side walls of said cover, each cover side wall including a pair of spaced apart connector clamps, each clamp ending in a foot that extends inwardly from a bottom edge portion of respective said side wall and has an upwardly facing surface adapted to engage a said clamping surface of a respective said flange;

whereby when said card is inserted into said cover, and said card-holding cover is being assembled to said base during initial stages of assembly with said cover off-set forwardly with respect to said base, said base flanges are positioned beside respective said clamps and as said cover is translated rearwardly to a closed position, said clamps are moved relatively onto and the feet thereof are pressed against said clamping surfaces of respective said base flanges and become latched therewith, with clamps and said base flanges biasing said cover and base together and securing said cover and base from relative lateral movement and from movement directly apart for said contacts of said base to assuredly remain compressively engaged with corresponding contact pads of said card.

2. The card reader connector of claim 1 wherein said base includes a protrusion extending upwardly from a card receiving face proximate said rearward wall, said protrusion defining a first card stop surface.

3. The card reader connector of claim 1 wherein at least one of said pair of flanges includes a downwardly facing stop surface adapted to engage a cooperating stop surface of a respective said side wall of said cover to stop rearward movement of said cover.

4. The card reader connector of claim 1 wherein said foot of at least one of said clamps of said cover includes an upwardly directed boss adapted to engage a cooperating surface of a respective associated flange of said base.

5. The card reader connector of claim 1 wherein said cover includes a tab extending downwardly from said rearward end thereof, said tab defining a second card stop surface.

6. The card reader connector of claim 1 wherein said cover further includes an inwardly directed cantilevered beam to assure said card is positioned against said card support rail portions.

7. The card reader connector of claim 1 wherein said cover includes a flange receiving opening proximate each said connector clamp, said opening being dimensioned to receive a respective clamp such that said clamping surface may be moved into engagement with said respective clamp.

* * * * *